(12) United States Patent
Toriyama

(10) Patent No.: US 8,282,484 B2
(45) Date of Patent: Oct. 9, 2012

(54) VIDEO GAME PROCESSING APPARATUS, VIDEO GAME PROCESSING METHOD AND VIDEO GAME PROCESSING PROGRAM

(75) Inventor: Motomu Toriyama, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 1350 days.

(21) Appl. No.: 11/928,014

(22) Filed: Oct. 30, 2007

(65) Prior Publication Data
US 2008/0146335 A1 Jun. 19, 2008

(30) Foreign Application Priority Data
Oct. 31, 2006 (JP) ................... 2006-296058

(51) Int. Cl.
*A63F 9/24* (2006.01)
(52) U.S. Cl. ........................................ 463/37
(58) Field of Classification Search ............ 463/37
See application file for complete search history.

(56) References Cited

U.S. PATENT DOCUMENTS

| 7,062,157 | B2 | 6/2006 | Iwai et al. |
| 2002/0057890 | A1 | 5/2002 | Iwai et al. |
| 2005/0164794 | A1 | 7/2005 | Tahara |
| 2006/0227139 | A1 | 10/2006 | Momose |

FOREIGN PATENT DOCUMENTS

| JP | 10-328414 | | 12/1998 |
| JP | 2002-052250 | A | 2/2002 |
| JP | 2002-292137 | | 10/2002 |
| JP | 2004-081346 | | 3/2004 |
| JP | 2005-211242 | A | 8/2005 |
| JP | 2006-288532 | A | 10/2006 |

OTHER PUBLICATIONS

English Language Abstract of JP 2002-052250 A.
English Language Abstract of JP 2006-288532 A.
English Language Abstract of JP 2005-211242 A.
English Language Abstract of JP 2002-292137.
English Language Abstract of JP 2004-081346.
English Language Abstract of JP 10-328414.

*Primary Examiner* — Corbett B Coburn
(74) *Attorney, Agent, or Firm* — Greenblum & Bernstein, P.L.C.

(57) ABSTRACT

A game program recognizes a graphic drawn by a player with an input device such as a touch pen (30). An icon corresponding to the graphic is matched and displayed on a display section (20). With such a configuration, the player is able to create a desired icon at a desired position. Thus, the content of the game program may be customized freely and varies widely. Accordingly, the player is able to enjoy a drawing operation with a touch pen. At the same time, it is possible to enhance the flexibility of the development of the game story.

17 Claims, 13 Drawing Sheets

FIG. 4

| BASIC DATA | | | MATCHING DATA | | | ... | CONTENT DATA | | | ... |
|---|---|---|---|---|---|---|---|---|---|---|
| ICON ID | ICON NAME | ICOM IMAGE | BRIGHT-NESS | TING OF COLOR | SIZE | | CHARACTER GROUP | SCENARIO | MAP | |
| 0001 | CASTLE | file 1 | 10:10:80 | 30 | | | GROUP CA | GROUP SA | GROUP MA | |
| 0002 | FOREST | file 2 | 50:50:0 | 70 | | | GROUP CB | GROUP SB | GROUP MB | |
| 0003 | LAKE | file 3 | 0:100:0 | 20 | | | GROUP CC | GROUP SC | GROUP MC | |
| 0004 | ... | ... | ... | ... | ... | | ... | ... | ... | |

70 — 71 — 72 — 73

81

| CHARACTER GROUP | PATTERN |
|---|---|
| GROUP CA | 1 |
| | 2 |
| | 3 |
| GROUP CB | 1 |
| | 2 |
| | 3 |
| | 4 |
| GROUP CC | 1 |
| | 2 |

82

| SCENARIO | PATTERN |
|---|---|
| SCENARIO SA | 1 |
| | 2 |
| | 3 |
| SCENARIO SB | 1 |
| | 2 |
| | 3 |
| | 4 |
| SCENARIO SC | 1 |
| | 2 |

83

| MAP | PATTERN |
|---|---|
| GROUP MA | 1 |
| | 2 |
| | 3 |
| GROUP MB | 1 |
| | 2 |
| | 3 |
| | 4 |
| GROUP MC | 1 |
| | 2 |

VIDEO GAME PROCESSING APPARATUS, VIDEO GAME PROCESSING METHOD AND VIDEO GAME PROCESSING PROGRAM

CROSS REFERENCE TO RELATED APPLICATION

The present disclosure relates to subject matter contained in Japanese Patent Application No. 2006-296058, filed on Oct. 31, 2006, the disclosure of which is expressly incorporated herein by reference in its entirety.

BACKGROUND OF THE INVENTION

1. Field of the Invention

The present invention relates to a game apparatus which advances a game in accordance with a game program, a game controlling method and a computer program.

2. Description of the Related Art

A role-playing game (hereinafter referred to as "RPG") has been known as one genre of video games, in which a lead character grows through various experiences such as solving problems or fighting against enemy characters to achieve an ultimate goal like a defeat of an enemy boss character. In this way an RPG usually progresses based upon a game story.

In an RPG, a player operates a player character to collect various kinds of information in a virtual world provided by the game and to execute various events based upon the collected information, thereby solving mysteries or secrets of the virtual world as well as growing the player character. Like this an RPG generally has elements of a character's growth and a story.

Recently, there exist games in which a game story is configured of multiple sub-stories. In such games, a combination of sub-stories may be varied in accordance with a player's selections of options provided during the progress of the game, selections of routes through which the player character moves in the virtual world or any other arbitrary actions that players can select. By varying the combinations of the sub-stories like this, a player may enjoy new events or new story developments every time the player plays the game, even if the player completed the game in the past.

As an example of the above-mentioned type of games, there exists so-called a "multi-ending type" of game. In the multi-ending type of game, a player may view other endings than the ending that the player viewed when he/she completed the game in the past. This is very effective way for having a player play a same game repeatedly. However, this type of game has a disadvantage that the burden on game developers should increase.

For the purpose of providing a player with various game stories as possible without adopting the multi-endings, for example, Unexamined Japanese Patent Publication No. 2002-292137 discloses a method for storing results of selections made by a player in respective selection points in which various options are provided for selection to advance the game. In Unexamined Japanese Patent Publication No. 2002-292137, when a player again plays a game which the player completed once, the options selected by the player in the previous play are omitted from the options provided in the selection points, thereby inevitably developing a scenario that is different from the scenario developed in the previous play.

Further, Unexamined Japanese Patent Publication No. 2004-81346 discloses a method for varying game progresses by providing a main scenario, which remains unchanged every time the player plays the game, and sub-stories, which are inserted in parts of the main scenario. According to Unexamined Japanese Patent Publication No. 2004-81346, the game progresses based upon the scenario that is made up freely by combining some parameters, such as settings of dialogues of non-player characters (hereinafter referred to as "NPC"), i.e., whether the dialogue is a normal conversation or a rumor, or seriousness of contents of the sub-stories. This method enables the game developers to provide players with more various story lines with fewer burdens on the development of the game.

Meanwhile, types of game apparatuses are diversified in recent years, and a game apparatus having a touch panel and a touch (stylus) pen, both of which serve as an input device, is in widespread use. The game apparatus or game terminal like this enhances flexibility of input processing by player. In puzzle games and the like particularly, an operation using the touch pen allows a player to take advantage of the player's expressiveness, thereby enhancing the player's interest in the game.

Unexamined Japanese Patent Publication No. H10-328414 discloses a method that makes full use of this feature in an RPG. According to Unexamined Japanese Patent Publication No. H10-328414, a player draws a graphic of item that the player wants a player character to use in a battle scene and the like in the RPG by a pen input using the touch pen and the like. The item that appears in the battle scene is determined based on a result of a graphic recognition that is performed automatically when the pen input occurs. Accordingly, the player has to draw the item as accurately as possible so that the item that the player wants to use should appear. Thus, this method improves interest of the player in the game by performing the graphic drawing that is unique to the pen input.

However, according to the method disclosed in Unexamined Patent Publication No. 2002-292137, a game scenario varies in only the selection points set by the program in advance. Also, because the options that were selected by the user when the user played the game in the past are automatically omitted, the player is forcibly deprived of a chance to experience his/her favorite story again. Therefore, the player's interest in the game may be degraded. In Unexamined Patent Publication No. 2004-81346, the flexibility of game story development is insufficient.

Also, according to Unexamined Patent Publication No. H10-328414, only the items that appear in the game are varied by input operation using the touch pen, but the game story itself does not change. Therefore, the player's interest in the game may be lowered.

SUMMARY OF THE INVENTION

It is an object of the present invention to solve the problems described above. It is also an object of the present invention to enable a player to enjoy drawing a graphic with a touch pen and to improve the flexibility of game story development.

According to a first embodiment of the present invention, there is provided a video game processing apparatus that controls a progress of a video game by displaying a player character on a display screen of an image display apparatus and controlling an action of the player character displayed on the display screen in accordance with an operation by a player. The apparatus includes a created-object data table that stores one or more created-object icons to be displayed on the display screen in association with created-object data. The method further includes a graphic recognizing system that recognizes a graphic drawn with an input device. The method further includes a matching system that selects, from a plurality pieces of created-object graphic data stored in the created-object data table, at least one created-object having data similar to data of the graphic recognized by the graphic recognizing system. The method further includes an icon creating system that displays the created-object icon corresponding to the created-object selected as a result of the matching on the display screen.

On the display screen, the graphic drawn by the input device is displayed in a drawing screen separated from a game screen in which the video game progresses.

The graphic is drawn in a color selected arbitrarily from a plurality of pieces of color data, and the graphic recognizing system recognizes the color data of the drawn graphic.

The drawing screen is divided into a plurality of regions and the graphic recognizing system recognizes a size of the graphic based upon positions and a number of the regions to which the drawn graphic belongs.

The graphic recognizing system recognizes a shape of the drawn graphic based upon shapes, positions, sizes or angles of straight lines or curved lines constituting the drawn graphic.

In the created-object data table, there are stored icon image data relating to the created-object or created-object information relating to scenario data, character data, map data or item data corresponding to the created-object. When the matching system selects the created-object, an icon image having the created-object information corresponding to the selected created-object is displayed based upon the icon image data corresponding to the selected created-object.

In the created-object data table, there are stored model created-object graphic data serving as model input data of an abstract graphic to be drawn by the player with a drawing system to create the desired created-object icon.

Multiple pieces of the created-object information relating to the scenario data, the character data and the map data are provided in association with different respective ones of the created-objects. It is determined which of the scenario data, the character data and the map data is selected based upon a difference between the created-object graphic data and the model created-object graphic data.

The matching system selects, from the created-object data stored in the created-object data table, one piece of the created-object data having the created-object graphic data that is most similar to information about at least a shape of the graphic recognized by the graphic recognizing system. The matching system displays the created-object icon corresponding to the selected created-object data on a matching result display screen.

The matching system selects, from the created-object data stored in the created-object data table, multiple pieces of the created-object data having the created-object graphic data that is similar to the information about at least a shape of the graphic recognized by the graphic recognizing system. The matching system displays the created-object icons corresponding to the selected created-object data on the matching result display screen.

The video game processing apparatus further includes a matching result confirming system that allows a player to confirm whether the created-object icon displayed on the matching result display screen is the created-object icon that the player intends. When the matching result confirming system confirms that the matching result is in accordance with the player's intention, determination process of the matching result is performed by a matching result determining system.

When the multiple created-object icons are displayed in the matching result display screen, a desired created-object icon is selectable by the matching result determining system.

The video game processing apparatus further includes a graphic recognition error notifying system that, when there is no created-object graphic data similar to the graphic data acquired by the graphic recognizing system, notifies the player that no corresponding created-object data exists.

An error display made by the graphic recognition notifying system includes a display that allows the player to select whether to input the graphic again or to cancel graphic input processing.

The created-object data table includes created-object data acquisition condition for determining whether it is possible to display the created-object icon on the display screen with the drawing system based upon a level of the player character or a progress status of the game.

According to a second aspect of the present invention, there is provided a video game processing method for controlling a progress of a video game by displaying a player character on a display screen of an image display apparatus and controlling an action of the player character displayed on the display screen in accordance with an operation by a player. The method includes recognizing a graphic drawn with an input device. The method further includes selecting, from a plurality pieces of created-object graphic data stored in a created-object data table, at least one created-objects having data similar to data of the recognized graphic. The method further includes displaying at least one of the selected created-object icons corresponding to the selected created-objects on the display screen.

The graphic is drawn in a color selected arbitrarily from multiple pieces of color data, and the color data of the drawn graphic is recognized in the recognizing of the graphic.

The drawing screen is divided into multiple regions and a size of the graphic is recognized based upon positions and a number of the regions to which the drawn graphic belongs.

In the recognizing of the graphic, a shape of the drawn graphic is recognized based upon shapes, positions, sizes or angles of straight lines or curved lines constituting the drawn graphic.

In the created-object data table, there are stored icon image data relating to the created-object or created-object information relating to scenario data, character data, map data or item data corresponding to the created-object. In the selecting of the created-object, an icon image having the created-object information corresponding to the selected created-object is displayed based upon the icon image data corresponding to the selected created-object.

In the created-object data table, there are stored model created-object graphic data serving as model input data of an abstract graphic to be drawn by the player in a drawing processing to create the desired created-object icon.

In the matching, one piece of the created-object data having the created-object graphic data that is most similar to information about at least a shape of the recognized graphic from the created-object data stored in the created-object data table, and the created-object icon corresponding to the selected created-object data is displayed on a matching result display screen.

In the matching, a plurality of pieces of the created-object data having the created-object graphic data that are similar to the information about at least the shape of the recognized graphic from the created-object data stored in the created-object data table, a plurality of the created-object icons corresponding to the selected created-object data on are displayed the matching result display screen.

The video game processing method further includes matching result confirming processing that allows a player to confirm whether the created-object icon displayed on the matching result display screen is the created-object icon that the player intends. When it is confirmed that the matching result is in accordance with the player's intention, a determination process of the matching result is performed in matching result determining processing.

When the plurality of the created-object icons are displayed in the matching result display screen, a desired created-object icon is selectable in the matching result determining processing.

The video game processing method further includes graphic recognition error notifying processing for notifying the player that no corresponding created-object data exists when there is no created-object graphic data similar to the graphic data acquired in the graphic recognizing processing.

An error display made in the graphic recognition notifying processing includes a display that allows the player to select whether to input the graphic again or to cancel graphic input processing.

The created-object data table includes created-object data acquisition condition for determining whether it is possible to display the created-object icon on the display screen in the drawing processing based upon a level of the player character or a progress status of the game.

According to a third aspect of the present invention, there is provided a video game processing program for causing a computer to control a progress of a video game by displaying a player character on a display screen of an image display apparatus and controlling an action of the player character displayed on the display screen in accordance with an operation by a player. The program causes the computer to manage created-object data by storing one or more created-object icons to be displayed on the display screen in association with the created-object data. The program further causes the computer to recognize a graphic drawn with an input device. The program further causes the computer to select, from a plurality pieces of created-object graphic data stored in a created-object data table, at least one created-object having data similar to data of the recognized graphic. The program further causes the computer to display the created-object icon corresponding to the selected created-object on the display screen.

According to the present invention, a player is able to arrange the content of a video game. Therefore, it is possible to develop a game story having contents varied from player to player. Also, the game contents may vary each time a single player plays the video game repeatedly. Thus, it is possible to maintain the player's interest in the game for long periods and to enhance the player's enjoyment of the video game.

BRIEF DESCRIPTION OF THE DRAWINGS

FIG. 4 is an exemplary table showing contents of a created-object icon table according to an embodiment of the invention;

DESCRIPTION OF THE PREFERRED EMBODIMENTS

Figure 1:
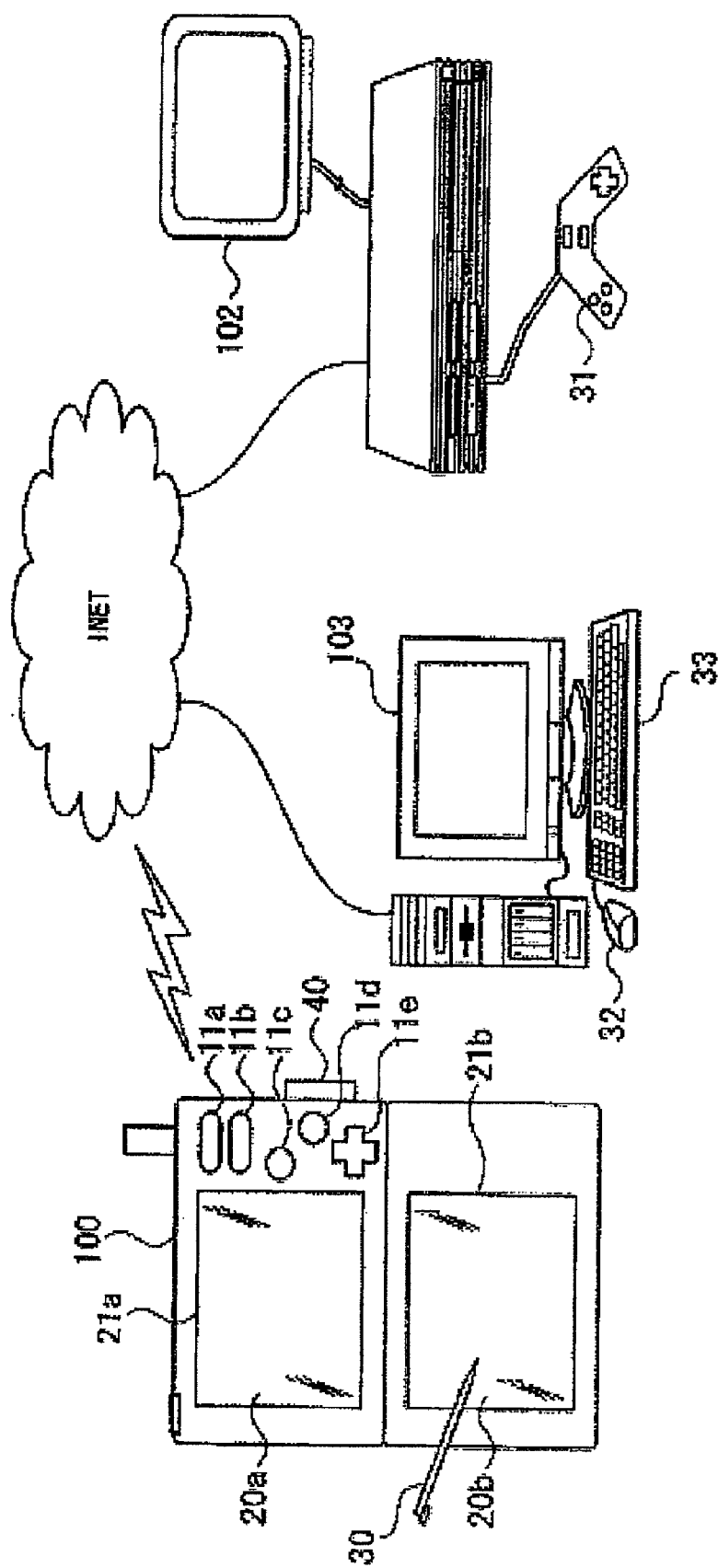
FIG. 1 is a block diagram showing a configuration of a player terminal according to an embodiment of the invention.

An embodiment of the present invention will be explained below in detail with reference to the drawings. FIG. 1 is a diagram showing a configuration of a player terminals and the network according to the embodiment of the invention. The player terminals include terminals 100, which respectively include display sections 20a, 20b, 102 and 103 for displaying a game screen and a drawing screen. Each of the player terminals also includes a control section (not shown) for controlling a game program, an operation input section used for advancing a game, and a drawing section used for executing a drawing processing. Each of the display sections includes at least one display screen. The display section may be integrated with a terminal as shown in the player terminal 100. As shown in a player terminal 101 or 102, the display section, the operation input section, the drawing section and the control section may be connected with each other. Also, operation input buttons 11a to 11e, a touch pen 30, a controller 31, and/or a mouse 32 may be served as the operation input section. The touch pen 30, the controller 31 and/or the mouse 32 may be served as the drawing section.

In addition, as shown in FIG. 1, the player terminal 100 to 102 may be connected to the Internet in a wireless or wired manner.

A player terminal used by a player will be explained with reference to FIG. 2 according to an embodiment of the present invention. The player terminal explained below is only an example, and it is not necessary that the player terminal should include all of the components described below. The description will be given for facilitating the understanding of the invention. Any process or components that are not much related to the nature of the present invention will be explained in a simple manner, or the explanation therefore will be omitted.

The player terminal 100 in FIG. 1 is an exemplary terminal including the display section and the operation input section in a unit. In the present invention, it is preferable for a player to use this type of terminal, and therefore this type of terminal will be explained first. The player terminal 100 includes a first display section 20a and a second display section 20b. As the display section, for example, a liquid crystal display, an electronic luminescence (EL) display, a plasma display and the like are used.

For facilitating the operational input by the user, either one of the two display sections 20a and 20b is used for displaying a game screen, and the other one is used for displaying the drawing screen.

The player terminal also includes, in addition to the display sections, a power button (not shown), operation input buttons 11a to 11e. The operation input buttons are constructed from, for example, a direction instruction switch 11e, a start switch 11a, a select switch 11b, an action switches 11c and 11d, etc. The direction instruction switch 11e works as a digital joystick and is used for moving a player character, a cursor and the like. The action switch is used for particular actions such as selecting items, jumping, punching and the like.

Touch panels 21a and 21b are preferably laminated on either one or both of the first display section 20a and the second display section 20b. When a player presses or touches (hereinafter referred to as "press") the surfaces of the touch panels 21a and 21b with a touch pen 30, a pen input device (not shown) such as stylus pen or the player's finger (hereinafter referred to as "touch pen 30"), the touch panels 21a and 21b detects a coordinate of the operational input position of the touch pen 31. Then, coordinate data of the detected coordinate is output, and the output coordinate data is sent to the control section.

The player terminal 100 includes a section for obtaining game contents from outside. As shown in FIG. 1, the player terminal 100 includes a memory card (or game cartridge) 40 in a removable manner. The memory card is inserted in a cartridge slot. Also, without using a physical medium such as a memory card and the like, the game contents may be downloaded via a network wirelessly, although not shown in the figure. Further, the game contents may be obtained from a hardware such as a personal computer and the like which is connected to the player terminal 100 via a USB cable and the like.

Although omitted in FIG. 1, the player terminal also includes, other than all of the components described above, a battery housing box, a speaker, a volume control switch, an external enlargement connector, an earphone and the like, which provide general functions necessary for a portable game machine.

Figure 2:
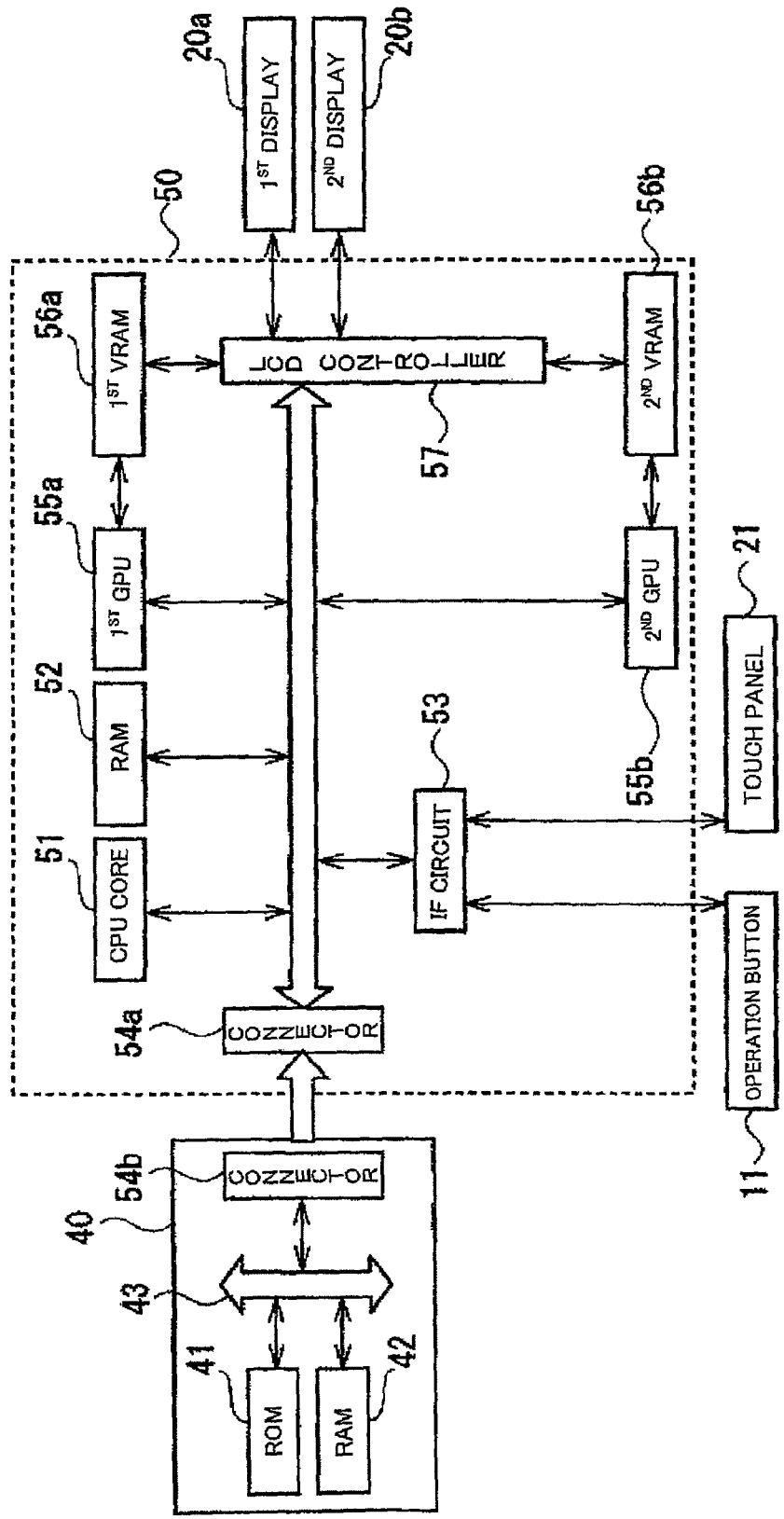
FIG. 2 is a block diagram showing an electrical structure of a player terminal according to an embodiment of the invention.

FIG. 2 is a block diagram showing an electrical configuration of the player terminal 100. The player terminal includes a control section 50, which are implemented by a circuit component such as a CPU core 51. The CPU core 51 is connected to a connector 54 via a bus 58. A RAM 52, a graphics processing unit (GPU) 55, an input/output interface circuit (hereinafter referred to as "I/F circuit") 53 and an LCD controller 57 are connected to the bus 58.

An explanation will be given of a case where a memory card 40 is connected to the connector 54 in a removable manner. The memory card 40 includes a ROM 41 and a RAM 42, which are connected with each other via a bus 43. The memory card 40 also includes the connector 54b, which is connected to the connector 54b. Therefore, as described above, the CPU core 41 accesses the ROM 41 and RAM 42 via the connector 54.

The ROM 41 stores, for example, a game program used for reproducing game contents executed by the player terminal 100, various image data of characters, backgrounds and the like, sound data necessary for the game in advance. The RAM (backup RAM) 42 stores data indicative of the process or result of the game.

The game program, various image data and sound data are read from the ROM 41 at once or sequentially in parts. The data read from the ROM 41 are stored in the RAM 52.

The graphics processor 55 forms a part of the drawing section, and receives drawing instruction the CPU core 51 to generate game image data.

The I/F circuit is connected to the operational input switch 11 and the touch panel 21. When the operational input switch is operated, a corresponding operation signal (operation data) is input to the CPU core 51 via the I/F circuit 53. Also, the coordinated data from the touch panel are input to the CPU core 51 via the I/F circuit.

In the case where the player terminal 100 includes the first display section 20a and the second display section 20b, it is preferable that the first and second display section 20a and 20b respectively includes the GPU 55a and the VRAM 56a and the GPU 55b and the VRAM 56b.

Although the example of the player terminal 100 having the display sections, the operation input sections and the like in a unit has been explained, a personal computer or a household game machine that is widely used may be used. In this case, such a personal computer or a household game machine includes an electric configuration as shown in FIG. 2, and an operational input device such as a controller and a mouse or a display such as a liquid crystal screen, for example, is connected to the personal computer or the household game machines. Thus, the exchange of electric signals as described above.

Figure 3:
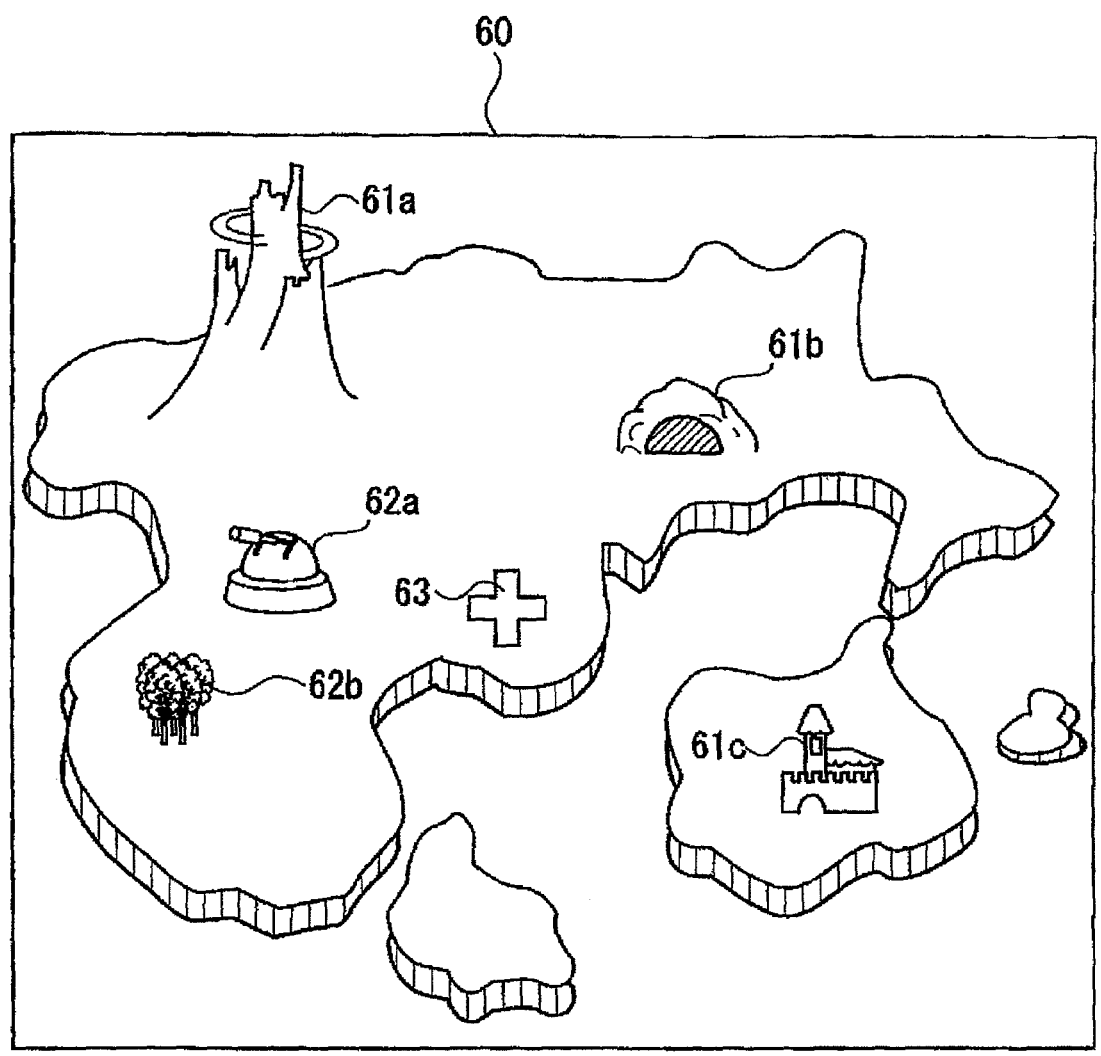
FIG. 3 is a diagram showing an example of a world map displayed on a game screen according to an embodiment of the invention.

FIG. 3 shows an example of a world map 60 of a virtual world displayed on a game screen. The player moves a player character on the world map 60 to advance the game. In this example, created-object icons 60 though which the player character necessarily passes in order to advance the game are drawn in advance on the world map 60. The player is not able to move or delete these created-object icons 61. However, the player is able to specify a desired position in blank portions on the world map 60 by moving a cursor 63 to the desired position, and to add a desired created-object 62 in the specified position in a method explained below in detail. The world map 60 shown here is an outline view of the game world. By moving the player character on a desired created-object icon 61 or 62, the player character proceeds to a stage indicated by the created object.

In addition, the created-object icon 61 through which the player character necessarily pass in order to advance the game may not be drawn on the world map 60 at the beginning, and it may appear on the world map 60 when the player completes a specific stage.

In order to realize the control as described above, it is necessary that the created-object icons are stored in association with various data relating to stages represented by the created-object icons. More specifically, the data are stored in a created-object data table 70 as shown in FIG. 4. In the created-object data table 70, there are stored basic data 71 relating to the created-object icon, including one or more created-object icon IDs, created-object icon names, created-object icon image data. The created-object data table also includes matching data 72 including color value data, color (chroma) saturation data, size data and shape data, which serve as feature parameters of abstract graphic data of the created-object icons necessary for executing a matching process described below. The created-object data table 70 also includes content data 73 including data about character groups, scenarios, maps and items relating to the stages to which the player can proceed by generating the created-object icons.

The content data 73 may include one or more detailed tables about the items such as the character groups and the scenarios that appear in the stage to which the player can proceed by generating the corresponding created-object icons, and multiple patterns of content data may be provided for a single created-object icon as described below.

In general RPGs, scenario data to be read next are selected from one or more type of scenario patterns set in advance at respective divergent points in accordance with a progress of the player character. In contrast, in the present invention, it is possible to develop a scenario having originality by generating the created-object icons in accordance with the player's operation in addition to the scenario diverging points set in advance by the game developer. It is also possible to make the scenario divergences occur by generating new created-object icons at desired timings and desired positions in addition to the timing when the player character reaches the scenario divergent points set in advance by the game developer.

When the player character is moved to overlap one of the created-object icons displayed on the game screen 20, a new stage represented by the created-object icon is developed. More specifically, the content data such as the scenario data and the map data included in the create-object icon are read. Then, the data displayed on the game screen 20 is switched from the world map representing a wide-area map of the game world to a detailed map displaying a detailed geographic data (map), characters and the like in the created-object icon.

For example, icons of buildings such as shops, inns, houses and churches, caves and parks are drawn on the detailed map. By overlapping the player character with the icons or moving the player character close to the icons, the player character is able to go to the inside of the buildings and the like represented by the icons. In the case where the icon with which the player character is overlapped represents a sign, the player character is able to read message on the sign. Also, when the player character faces a non-player character moving on the map, the player character is able to talk to the non-player character or battle against the non-player character, for example.

The player may obtain important information for advancing the game from the conversation with the non-player character. The information may be useful for advancing the game smoothly or may be indispensable for advancing the game. In the case where the information is indispensable one for advancing the game, a flag indicating whether the information is already obtained may be set for managing data.

Further, in addition to the created-object icons displayed on the world map, some of the icons displayed on the detailed map may be generated in a desired position by drawing the icons in accordance with the player's input.

For example, it is possible to enable the player character to cross a river by drawing a picture of a bridge over a river drawn in advance on the detailed map and thereby producing the bridge. Also, it is possible, for example, to enable the player character to go up onto a roof of the building by drawing a picture of a ladder. In order to allowing the player to perform such special actions, the instructions for prompting the player to draw the picture may be provided at the corresponding points through the "sign" or the conversation with the non-player character as described above. For example, instructions like "if you draw the bridge, you can cross the river" or "if there is a ladder, you may go up on to a roof!" may be provided.

Hereinafter, a procedural flow for displaying the created-object icon appears by the player's graphic drawing will be explained.

Figure 5:
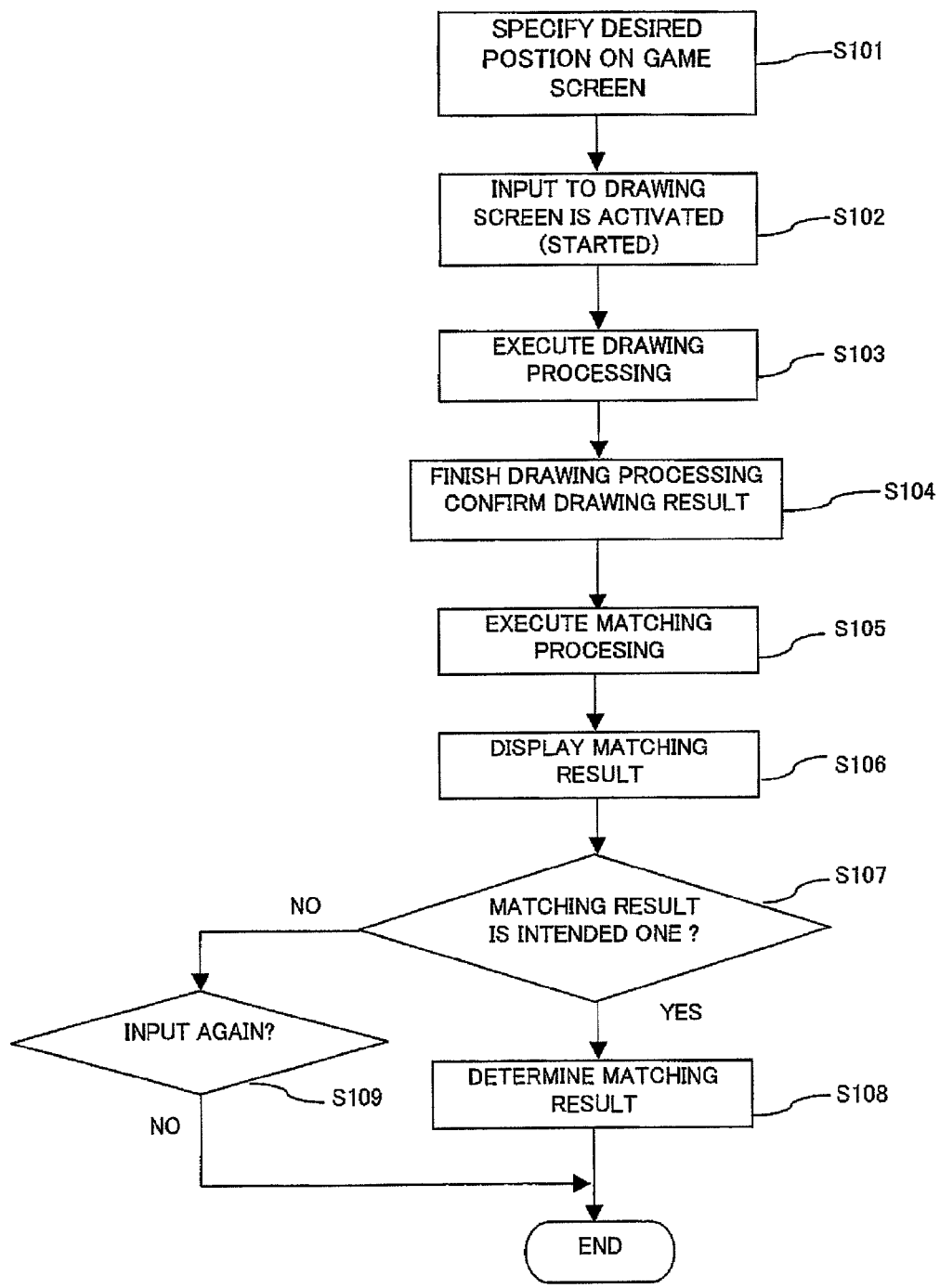
FIG. 5 is a flowchart showing a matching process according to an embodiment of the invention.

FIG. 5 is a flowchart showing a processing for drawing an abstract graphic by using the player terminal 100 and thereby displaying the created-object icon on the game screen. In this embodiment, in order to keep the description simple, an explanation will be give to a case where a player P executes a drawing processing by using the player terminal 100. Also, descriptions of processes other than those particularly related to the invention may be omitted.

On the game screen displayed on the display section 21 of the player terminal 100, the player P specifies, by using position-specifying means, a desired position in the virtual world of the game, at which position the player wants the created-object icon appear (step S101). Specifically, in this embodiment, the position-specifying means is implemented by pointing means such as a cursor. In the case where a touch pen is assumed as the pointing means, it is possible to specify the position by pointing the desired position on the game screen with the touch pen directly without displaying the cursor.

When the position is determined where the player wants the created-object appear in the position specifying processing as described above (step S101), a drawing processing on the drawing screen becomes effective (S102). A drawing result of the drawing by the player P with a drawing device such as a mouse and a controller is displayed on the drawing screen. In the case where the touch pen is used as the drawing device, the player draws a graphic directly on the drawing screen (S103).

When the drawing processing ends, the player P checks the drawing result displayed on the drawing screen and carries out determining processing of the drawing result (S104). Specifically, the determination of the drawing result is executed by pressing a "determination button", for example. When the determination processing ends, a matching processing for matching the drawing result and the abstract graphic data included in the created-object data table is carried out by matching means (step S105).

When the matching processing ends, a matching result is displayed on the display section 21 (step S106). The player P determines whether the displayed matching result corresponds to what the player P intended (step S107). When what the player P intended is recognized in the matching processing ("Yes" at step S107), the player P determines the matching result (S108). On the contrary, when the displayed matching result is different from what the player P intended to draw ("No" at step S107), the player P determines whether the player P will draw a graphic again (step S109). In the case where the player determines that he/she draws the graphic again ("Yes" at step S109), the processing procedure returns to the drawing processing (step S103). In the case where the player P determines that he/she will not input the graphic again ("No" at step S109), the processing procedure ends.

Here, multiple candidates of the matching result may be provided in order of approximation. When the matching result displayed first does not correspond to what the player intended to draw ("No" at step S107), another candidate of the matching result having the second-highest approximation may be displayed.

When the matching result is determined (step S 108), the created-object icon determined in the matching processing is displayed the position specified by the player P on the game screen.

The process in which the player P draws the abstract graphic by hand on the game screen will be explained in detail.

FIGS. 6 to 11 are diagrams for showing the drawing screen 200. A main part of the drawing screen is used for a drawing region 210 for drawing the abstract graphic by hand. In the case where a touch pen is used for input in the player terminal 100, the player P touches the drawing region 210 directly with the touch pen so as to draw the abstract graphic. Also, in the case where devices such as a mouse are used for drawing, the drawing result is displayed in the drawing region 210.

A region other than the drawing region 210 on the drawing screen 200 is used as an operation region. The operation region is used for selecting a width or color of a line for drawing the handwritten abstract graphic or for determining of start or finish of the drawing.

Figure 6:
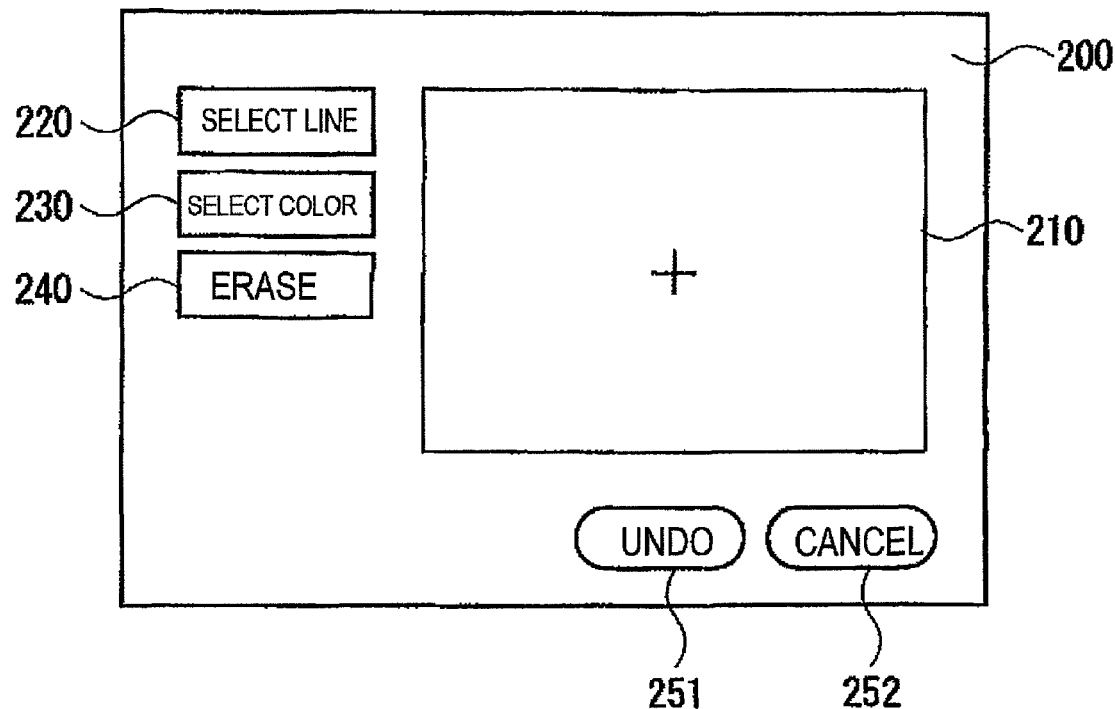
FIG. 6 is a diagram showing a menu display status on a drawing screen according to an embodiment of the invention.
Figure 7:
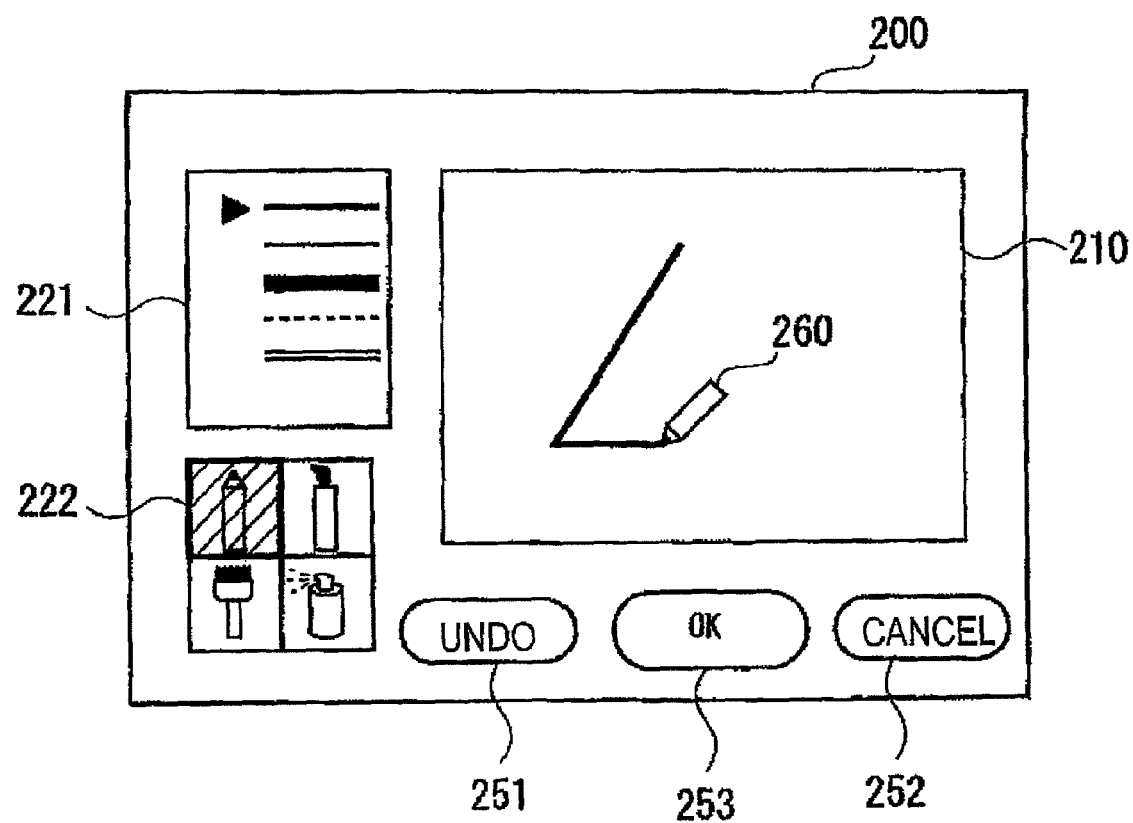
FIG. 7 is a diagram showing a screen on which a detailed menu corresponding to "selecting a line" is displayed according to an embodiment of the invention.
Figure 8:
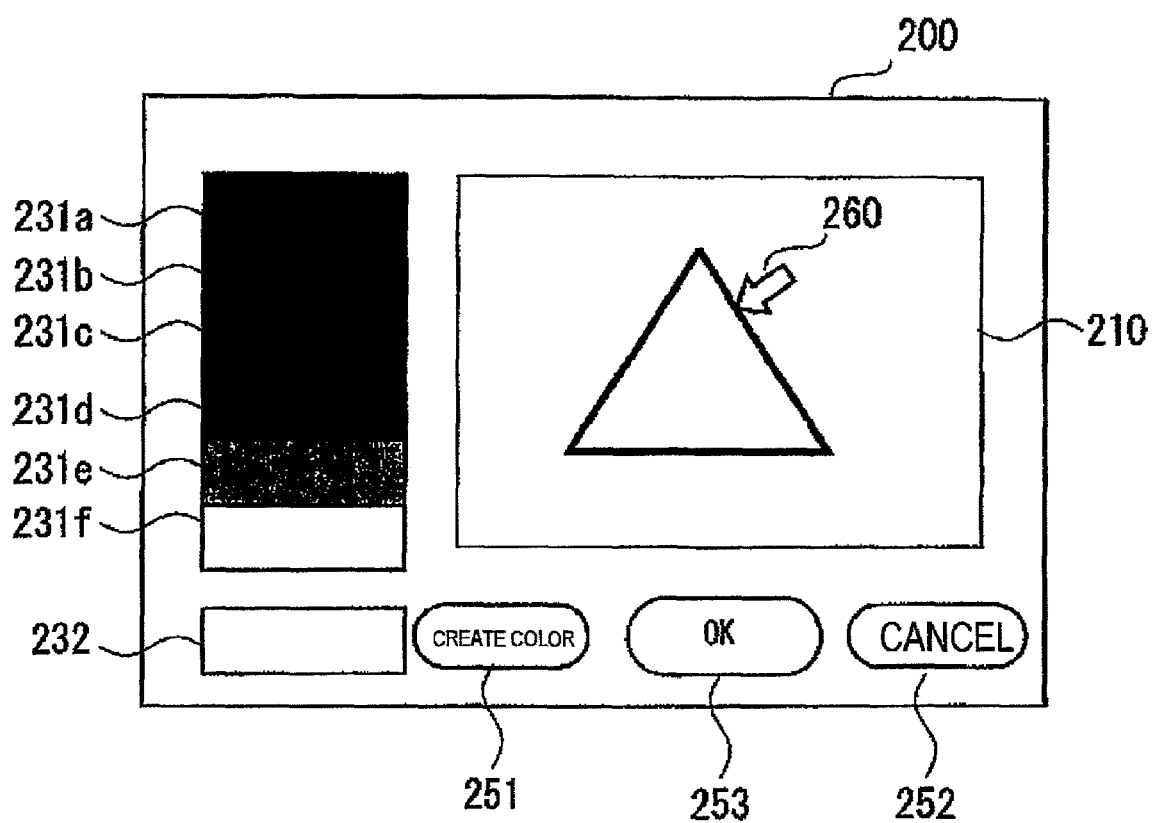
FIG. 8 is a diagram showing a screen on which a detailed menu corresponding to "selecting a color" is displayed according to an embodiment of the invention.
Figure 9:
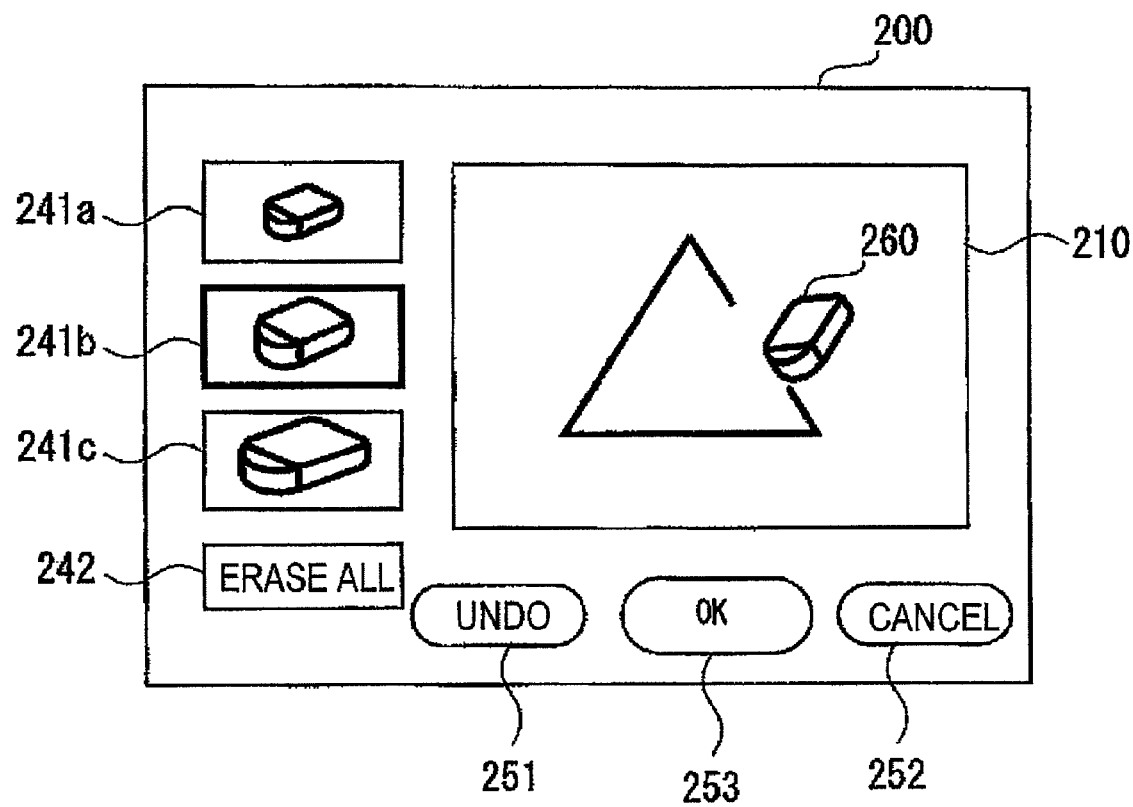
FIG. 9 is a diagram showing a screen on which a detailed menu corresponding to "erasing" is displayed according to an embodiment of the invention.
Figure 10:
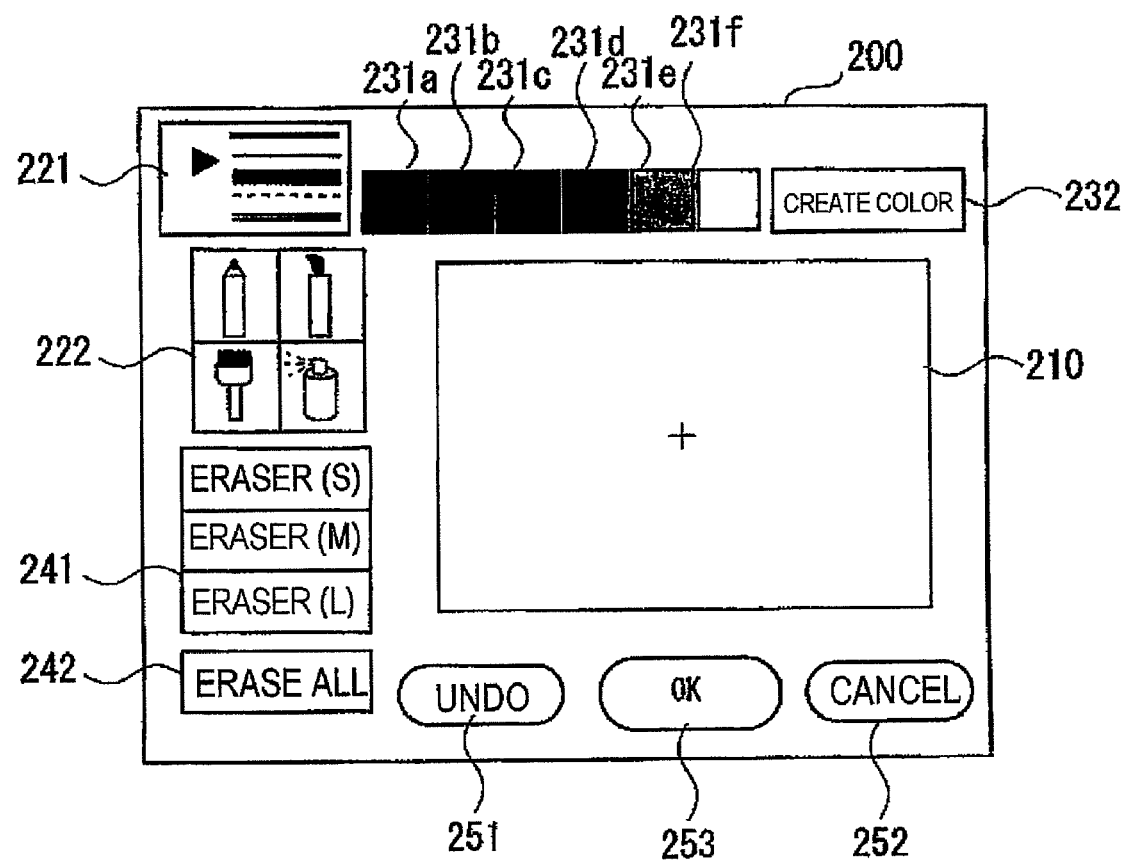
FIG. 10 is a diagram showing a screen on which all detailed menus is displayed at a same time according to an embodiment of the invention.

In order to have the drawing region as large as possible, menu buttons 220, 230 and 240, which respectively correspond to "select line", "select color" and "delete" are firstly displayed in the operation region so as to have the player P select one of the menu buttons 220, 230 and 240, as shown in FIG. 6. Then, a detailed menu screen is displayed in response to the player's selection as shown in FIGS. 7 to 9. Otherwise, in order to minimize such a switch of screens, all of the menus relating to the drawing may be displayed at once without displaying menu buttons 220, 230 and 240, as shown in FIG. 10.

When the "select color" button 220 is selected in FIG. 6, the detailed menu for selecting the width or texture of the line is displayed on the screen as shown in FIG. 7. The player P selects a desired one from various widths or types (dotted line or double line, for example) displayed in a region 221. Then, the player selects a desired texture from candidates displayed in a region 222. Here, either the width or the texture may be selected first. Also, the texture and the width of the line may be set in advance so as not to allow the player P select the desired one, and a certain width and texture may be always used.

The width and the texture of the lines of the drawing result by the player P displayed on the drawing region 210 vary depending on the width and the texture of the line selected in the regions 221 and 222. Also, in addition to the drawing result, the cursor displayed when the player P draws the graphic may be varied depending on the selected width and texture. For example, in the case where a pencil is selected as the texture, a pencil-shaped cursor may be displayed. Also, in the case where a spray is selected, a spray-can-shaped cursor may be displayed.

When the "select color" button 230 is selected in FIG. 6, a detailed menu for selecting a color is displayed in the screen as shown in FIG. 8. The player P selects a desired one from candidates of colors displayed in a region 231. Here, in the case where there is no color that the player wants to use, a "create color" button 232 may be selected. When the "create button color" button 232 is selected, the screen may be switched to a blend-color screen described below, and a new color may be created any used by blending the existing colors.

When the color is selected, a color of an entirety or a part of the drawn handwritten abstract graphic is changed to the selected color. In the case where the color of a certain part of the handwritten abstract graphic should be changed, the certain part may be specified with the cursor 260.

Figure 11:
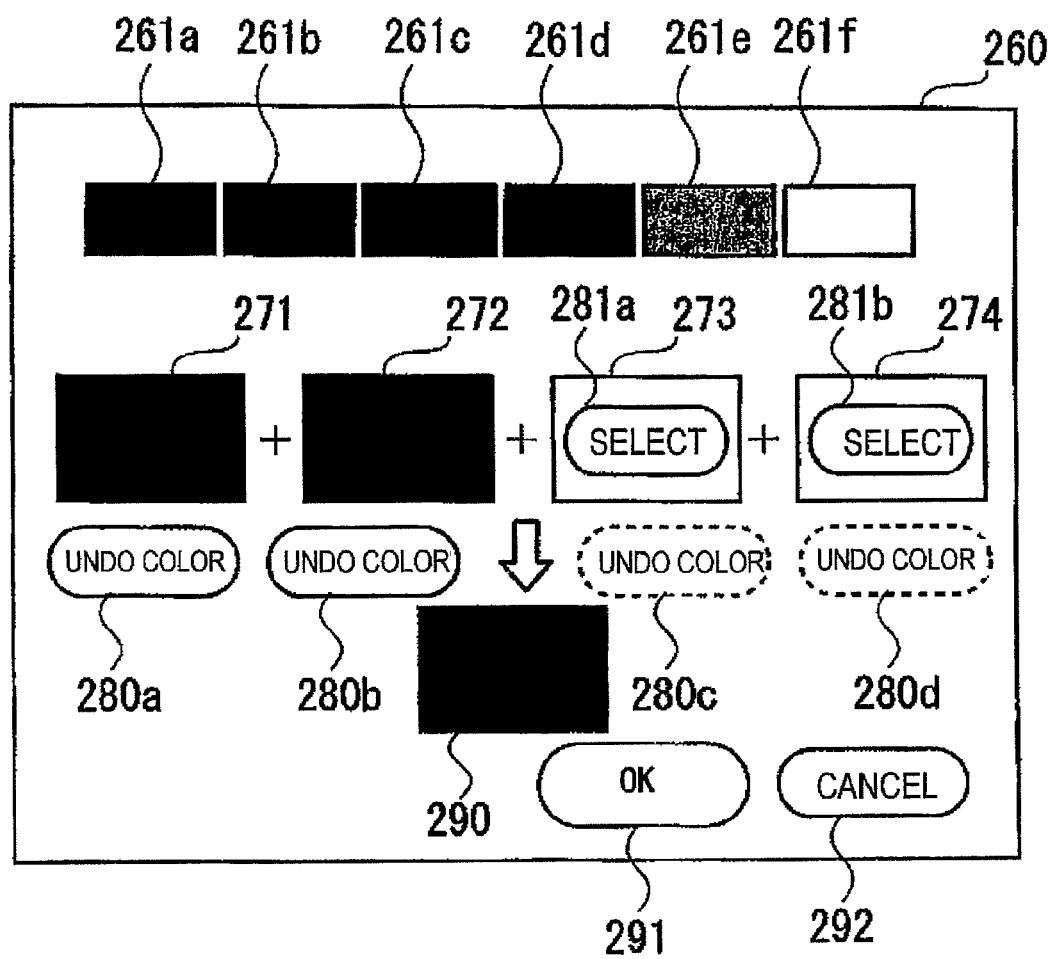
FIG. 11 is a diagram showing a color blend screen according to an embodiment of the invention.

FIG. 11 is a diagram showing an example of the blend-color screen 260. In the case where there is no color that the player P wants to use in the region 231 of the FIG. 8, the player P selects the "create color" button 232 so that the screen is switched to the blend-color screen 260. The blend-color screen 260 includes a region 261 for displaying the existing colors, color-data-blend regions 271 to 27N for showing multiple pieces of color data of colors selected to blend colors and blend result display region 290 for displaying the blended color data. Here, the number of the pieces of color data to be selected in the color-data-blend regions 271 to 27N may be limited in order to prevent the color blending to be too complicated. Thus, the player P has to select color data to be deleted from the existing colors so as to add new color by blending the existing colors, and therefore the player P has to consider strategically which colors should remain unselected. Thus, the player's interests and tastes of the game should be improved.

A sample of the color data created as a result of the blending of colors selected in the color-data-blend regions 271 to 27N is displayed in the blend result display region 290. The player P is able to create the color that he want to use while checking the sample data displayed in the blend result display region 290. In the case where a new color should be added to the color that is already created by the blending, it is possible to add the new color by selecting one of the color-data-blend regions 27N in which the color data is not yet selected or by selecting the "select color" button 281 displayed near the color-data-blend regions 271.

In the case where the sample of the color data displayed in the blend result display region 290 is not a color that the player P wants, the player is able to select an "undo color" button 280 displayed near the color data displayed in the color-data-blend regions 27N so as to reselect a desired color. Thus, the player P is able to cancel the color data that he/she once selected, and to select one of the color data again. In the case where the selected color data is cleared by activating the "undo color" button 280, the sample of the color data displayed in the blend result display region 290 changes accordingly.

The "undo color" button 280 is not displayed on the blend-color screen 260 or is grayed out (280c, 280d) so that the player should easily recognize that the button is not available, when the color data is not selected in the corresponding color-data-blend region 270N.

When the blending of the color data ends, an OK button 291 is activated to add the newly created color in the region 230 on the drawing screen 200, in which the color data are displayed.

When the "delete" button 240 is selected in FIG. 6, the detailed menu for specifying portions to be deleted is displayed on the screen as shown in FIG. 9. The player P selects a desired one from deleting means select buttons 241, and specifies a portion of the handwritten abstract graphic displayed on the drawing region with the cursor 260, which portion the player P wants to delete. Here, the drawing data corresponding to the specified portion are cleared in accordance with the feature of the deleting means selected in the deleting means select button 241. For example, when a big eraser is selected as the deleting means, a wide range of the specified potion is erased at once. Therefore, the big eraser is suitable for erasing a large area at once. Also, a small eraser may be selected when a detailed potion should be erased carefully. Here, a shape of the cursor 260 may be changed depending on the selected deleting means.

It is possible to erase the handwritten abstract graphic presently displayed at once by activating a "delete all" button 242.

When the graphic drawing ends, the player P activates an "OK" button 253 to finish the drawing processing. Then, the matching processing described below is started.

Also, an "undo" button 251 is selected in order to cancel a previous input during the drawing processing.

Furthermore, a "cancel" button 252 is selected in order to stop the drawing processing itself, instead of deleting the entirety or part off the drawing result. Thus, a processing for canceling the drawing processing is executed.

The matching processing will be explained in detail. With respect to the handwritten abstract graphic that the player P has drawn by the drawing means, the color and texture used for drawing and the shape, size and the like the drawn graphic are recognized by handwritten abstract graphic recognition means. Specifically, the recognized color, texture, shape, size and the like are subjected to numerical conversion, and feature parameters are extracted.

The numerical conversion of the color or texture, which is selected from the predetermined candidates, is executed as follows. For example, identification data for specifying the color are obtained when the color is selected on the drawing screen. Here, each of the colors to be selected is assigned with a color number, and the "brightness" and "tinge of color" are digitalized and stored in a color data table. With respect to the "tinge of color", a percentage of each of three primary colors, that is red, blue and yellow, included in the color may be stored. For example, "red" is represented by "red: blue: yellow=100:0:0". Also, "green" is represented by "red: blue: yellow=0:50:50". Then, the color data of the color selected by the player P are compared with the color data f the color supposed to be selected to generate the create-object icon. When the difference therebetween is smaller than a predetermined value, it is determined that a "same or similar" color is selected.

Also, the numerical conversion of data such as the shape and the size, which are not selected from candidates, is executed as follows. For example, in order to execute the numerical conversion of the shape, coordinates of the positions pointed by the input device are obtained every period of time (1/60 seconds=1 frame) from the start of the drawing processing by the player P. Then, a unit vector is obtained from a trajectory of the coordinates, and the numerical value may be obtained based upon the change of the vector. Otherwise, the numerical value may be obtained based upon the change of the distance (coordinates) from a predetermined reference point. Also, the numerical conversion may be executed by other suitable methods such as peak detection.

The size of the graphic may be determined by dividing the drawing screen into several areas and determining how many areas are occupied by the graphic drawn by the player or determining at which position in each area the graphic is drawn.

After executing the numerical conversion of the color or the size as described above, normal abstract graphic data necessary for creating a desired created-object icon are compared with the handwritten abstract graphic data obtained as a result of the numerical conversion of the handwritten abstract graphic input by the player P in the drawing processing as described above, and it is determined whether these data are same or similar with each other.

First, the data obtained by the numerical conversion about the features such as the color and the shape (hereinafter referred to as "feature parameter"), which data constitutes the handwritten abstract graphic data, are compared with the feature parameters of the normal abstract graphic data of each of the created-objects included in the created-object data table. Thus, a degree of difference between the normal abstract graphic data and the handwritten abstract graphic data are obtained with respect each element of the feature parameters. Then, the created-object icon that has the normal abstract graphic data most close to the handwritten abstract graphic data input by the player P is determined based upon a value calculated by the following formula;

$$(\text{Difference degree of the color parameters} + \text{difference degree of the texture parameters} + \text{difference degree of the shape parameters})/3$$

or $$\{(\text{Difference degree of the color parameters})^2 + (\text{difference degree of the texture parameters})^2 + (\text{difference degree of the shape parameters})^2\}^{1/2}$$

Then, the determined created-object icon is displayed as the matching result on the display screen of the player terminal 100.

Here, multiple candidates for the matching result may be provided that they are displayed one after another in order of decreasing matching rate.

Otherwise, the multiple candidates for the matching result may be displayed at once on the display screen so that the player should select the desired one from the candidates.

In this matching processing, recognition result candidates may be selected in order of decreasing matching rate. Then, the use conditions for each of the recognition result candidates are referred, and only the recognition result candidates that satisfy the corresponding use conditions may be displayed to the player P as the matching result candidates. Also, the matching result candidates that do not satisfy the use condition may be displayed in a form from which the player P may recognize that the corresponding candidates are not available. The method as described below may enable the player P to recognize that the candidates are not available.

Figure 12:
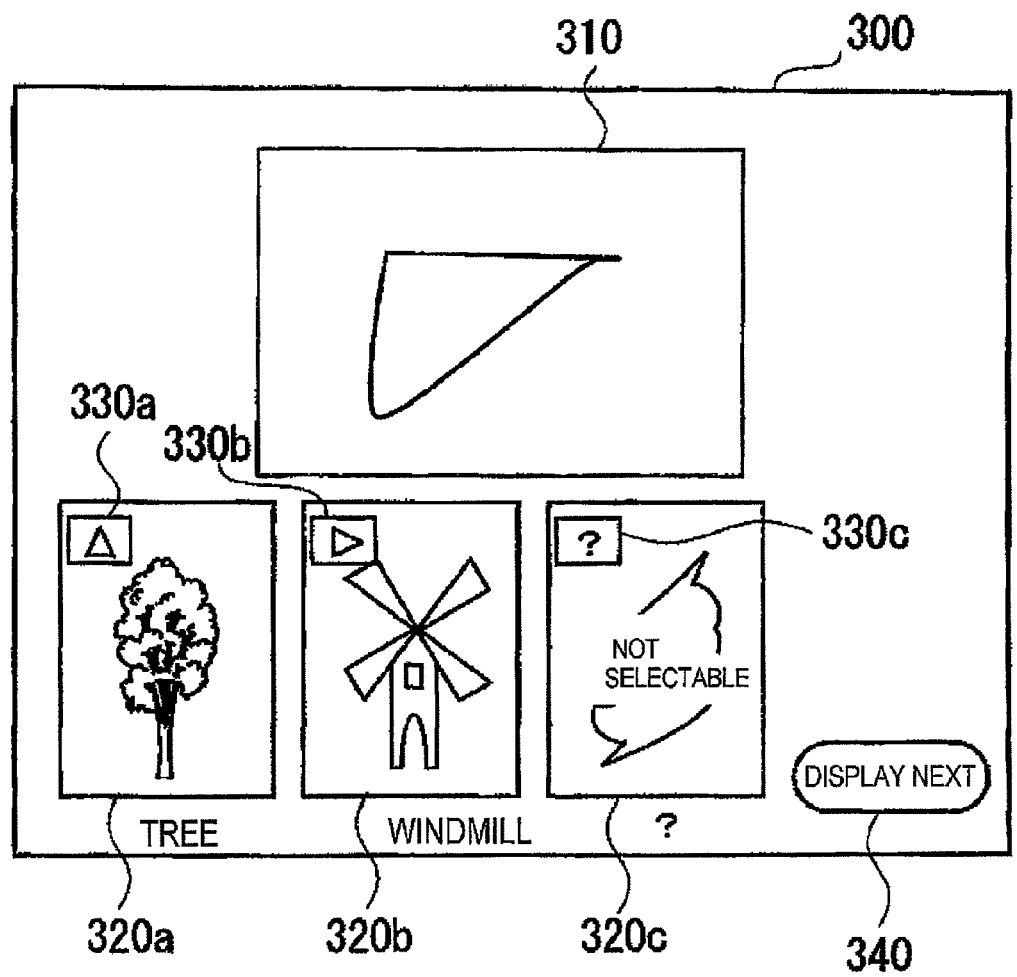
FIG. 12 is a diagram showing a first example of a matching result candidate display screen according to an embodiment of the invention.

FIG. 12 is a diagram showing an example of a matching screen 300 for determining the matching result. As shown in FIG. 12, a completed graphic of the handwritten abstract graphic drawn by the player P is displayed in a drawing result display region 310, and the multiple matching result candidates are displayed in a candidate display region 320. The icon images of the created-object icons to be the matching result candidates may be displayed in the candidate display region 320 together with the corresponding normal abstract graphics 330. Thus, the player P is able to recognize at once the degree of similarity between the handwritten abstract graphic 310 that the player P has draw and the normal abstract graphic 330 of the created-object icon.

Here, with the candidate that does not satisfy the use condition and therefore is made unselectable, a straightforward message such as "Not selectable" may be displayed. Also, a "?" mark may be preferably displayed instead of displaying the normal abstract graphic corresponding to the unselectable matching candidate. This is because the normal abstract graphics of new created-object icons should be preferably obtained when the player P solves problems or wins battles against enemy characters for advancing the game. This may prevent the player P from knowing the normal abstract graphic of the created-object icon that the player P has not obtained yet.

Figure 13:
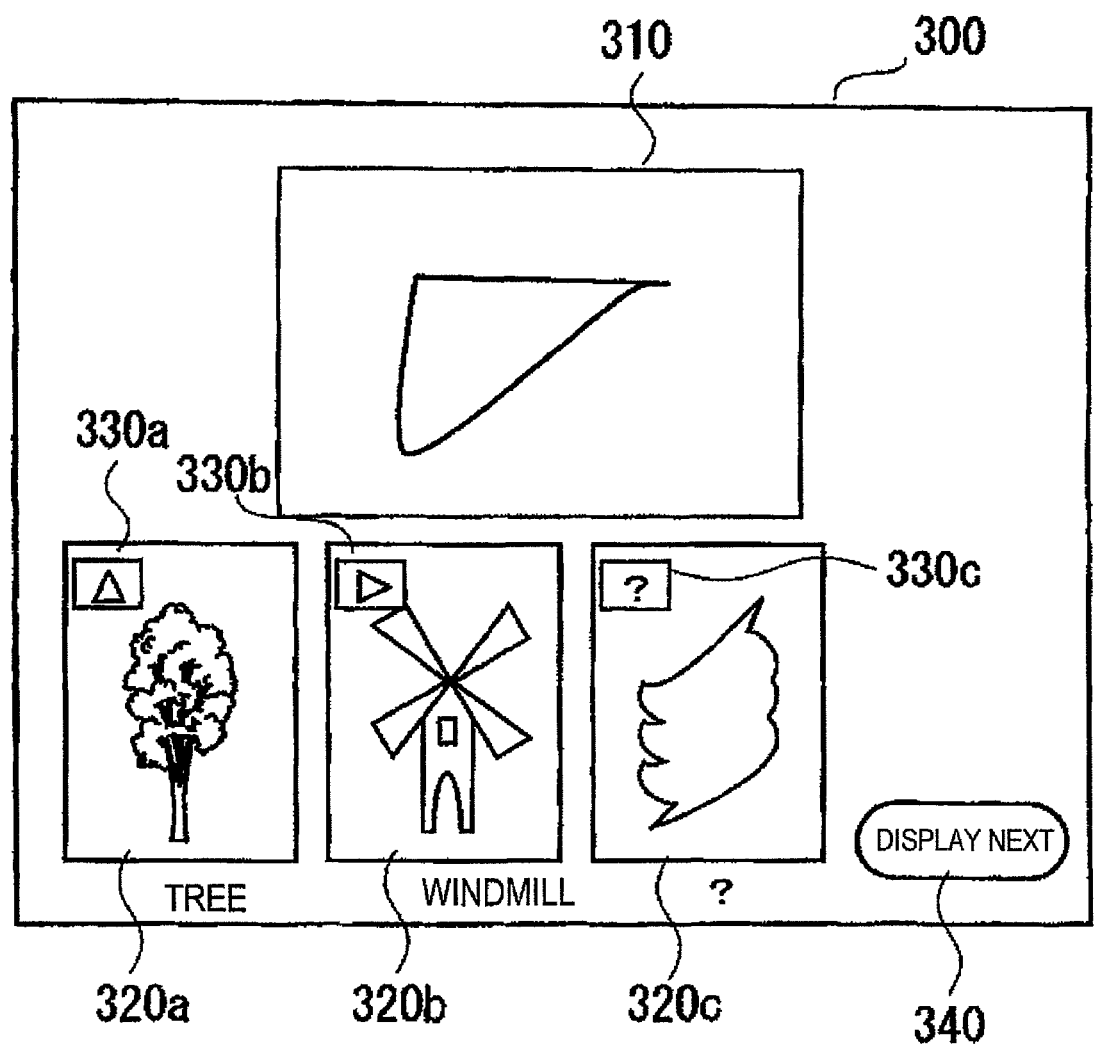
FIG. 13 a diagram showing a second example of a matching result candidate display screen according to an embodiment of the invention.

Also, as shown in FIG. 13, the matching result candidate that is unselectable may be grayed out or silhouetted. This may enable the player P to have an expectation that these icons will be created in future although the use conditions are not satisfied at this moment. This may enhance the player's willingness to satisfy the use condition for the created-object icon.

Otherwise, the matching result candidates that are unselectable may not be displayed at all in the candidate display region 320.

In the case where the degree of difference between the normal abstract graphic data and the handwritten abstract graphic data input by the player P is so big that no created-object data to be determined "similar", messages such as "No corresponding data is found" and "?" may be displayed to prompt the player P to input the abstract graphic again.

In such a case, a select button such as "draw again" may be displayed on the matching screen 300 so as to prompt the player P to perform drawing again.

Further, in the case where a large number of matching result candidates are detected and where it is impossible to display all of them at once on the matching screen 300, a candidate display switch button 340 such as "display next" may be displayed. After the next candidate is displayed by activating the candidate display switch button 340, another candidate display switch button such as "display previous" may be displayed on the screen on which the next candidate is displayed for returning to the previous screen. In the case where the number of the matching result candidates is small and where it is possible to display all of the matching result candidates on the matching result display screen displayed first, the candidate display switch button 340 may not be displayed or be grayed out, for example. This may enable the player P to recognize easily that the candidate display switch button 350 is not available.

In the case where the player terminal 100 includes multiple display screens, the drawing result display region 310 and the candidate display region 320 may be displayed in different respective ones of the multiple display screens. This makes it possible to display the images of the drawing result and the matching result candidates in an enlarged size, and thus operability of the player P may be enhanced.

The processing executed after the created-object icon is displayed on the game screen will be explained. When the desired created-object icon is determined from one or multiple created-object icon candidates as a result of the matching processing, the CPU 51 refers the created-object data table and reads various data about the determined created object icon. For example, the CPU 51 reads the icon image data of the created object icon and sends the data to the VRAM 56. Then, the CPU 51 makes the VRAM 56 to draw the icon image of the created-object icon in a desired position specified the player in advance on the game screen.

Here, even when the player P selects a certain created-object icon from the candidates displayed on the matching candidate result display screen and the corresponding created-object icon is generated in the game, the content of characters that appear when the player character proceeds to a stage corresponding to the generated created-object icon or the content of scenario may be varied depending on the degree of difference between the feature parameters obtained from the handwritten abstract graphic drawn by the player P and the feature parameters of the normal abstract graphic data included in the abstract data of the created-object icon.

To realize such a configuration, the content data of the created-object icons may be managed in multiple tables to which different respective ones of categories such as character groups, scenarios and maps are assigned as shown in FIG. 4. In the case where a "castle" is selected from the matching result candidates, for example, the created object icon to be displayed and basic data such as a name of the created-object icon may be commonly read from the basic data 71 in the created-object icon table. Meanwhile, Content information such as a scenario and a map of the created object icon may be respectively selected from tables 81 to 8N provided for each of the categories in the content data 73 and the selected information for each of the category may be combined in a way described below.

For example, with respect to each of the feature parameters, correspondence relations such as "the color data and the character data", "the shape data and the scenario data" and "the size data and the map data" may be set in advance, and the content data to be selected may be determined depending on the degree of difference of each feature parameter. For example, the correspondence relations as shown the following tables 1 to 3 are defined.

TABLE 1

| Degree of Difference of Color Data | Character Group to be Selected |
|---|---|
| 0 to less than 0.4 | 1 |
| 0.4 to less than 0.7 | 2 |
| 0.7 to 1.0 | 3 |

TABLE 2

| Degree of Difference of Shape Data | Scenario to be Selected |
|---|---|
| 0 to less than 0.4 | 1 |
| 0.4 to less than 0.7 | 2 |
| 0.7 to 1.0 | 3 |

TABLE 3

| Degree of Difference of Size Data | Map to be Selected |
|---|---|
| 0 to less than 0.4 | 1 |
| 0.4 to less than 0.7 | 2 |
| 0.7 to 1.0 | 3 |

In the case where the player P selects the "castle" from the multiple matching result candidates, the information of the content data 73 in the create-object icon table 70 are referred, and thereby a group CA, a group SA and a group MA are selected respectively for the character group, the scenario and the map.

Next, the feature parameters of the handwritten abstract graphic drawn by the player P are compared with the feature parameters off the normal abstract graphic of the "castle" included in the matching data 72 in the created-object icon table with respect of each of the categories such as colors and size, and the differences therebetween are obtained. In the case where the difference of the each of the parameters is "color; 0.5, shape; 0.8, size; 0.2", the character group 2, the character group 2, and the scenario 3 are selected according to the above tables. Thus, the pattern 2 of the Group CA, the pattern 3 of the Group SA and the pattern 1 of the Group MA are selected respectively for the character group, the scenario and the map.

Otherwise, the content data may be varied based upon the combination of the degree of difference of each of the multiple parameters as shown in the following table 4 instead of the simple correspondence relations as described above.

TABLE 4

| | SHAPE PARAMETER | | |
|---|---|---|---|
| SIZE PARAMETER | 0 to less than 0.3 | 0.3 to less than 0.5 | 0.5 to 1.0 |
| 0 to less than 0.4 | 1 | 2 | 3 |
| 0.4 to less than 0.7 | 1 | 3 | 2 |
| 0.7 to 1.0 | 2 | 3 | 1 |

With such a configuration as described above, in addition that it become possible for the player P to enjoy a game development having originality by generating a desired created-object icon in a desired position on the game screen and thereby developing a unique scenario, it is possible to vary the map data or character included in the created-object icon depending on a subtle difference of the result of the abstract graphic input by the player in the drawing processing, even when the same created-object icon is generated. For example, even in the case where the same icon of "castle" is generated, the scenery, the arrangement of rooms inside the castle or the characters that appear in the castle may vary depending on the status of the drawing result of the handwritten abstract graphic.

Thus, it is possible to provide a game development that is varied from player to player, and it is further possible to provide various game scenarios even when a player plays the same game repeatedly because the game content may vary depending on the subtle difference of the drawing result every time the player plays the game. Therefore, it is possible to prevent the player's taste or interest in the game from being degraded.

As described above, according to the present invention, it is possible for a player draws a graphic on a drawing screen with an input device such as a touch pen so that an icon corresponding to the graphic at a desired position in a game. Therefore, the present invention is useful for to a video game apparatus, a personal computer, a mobile telephone terminal, a portable game apparatus and the like which provide game contents varying depending on players who play the game.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and are not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

An Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. A video game processing apparatus that controls a progress of a video game by displaying a player character on a display screen of an image display apparatus and controlling an action of the player character displayed on the display screen in accordance with an operation by a player, the video game processing apparatus comprising:
    a created-object data table that stores created-object icons to be displayed on the display screen and created-object information relating to one of scenario data, character data, map data and item data corresponding to created-objects, the created-object icons corresponding to the created-objects and stored in association with created-object graphic data;
    a graphic recognizer that recognizes a graphic drawn by the player;
    a selector that selects, from the created-object graphic data stored in the created-object data table, at least one selected created-object of the created-objects similar to the graphic recognized by the graphic recognizer;
    an icon creator that displays at least one displayed created-object icon of the created-object icons corresponding to the at least one selected created-object on the display screen; and
    a central processor that receives a selection of a desired created-object icon of the at least one displayed created-object icons from the player in accordance with the operation by the player, and that controls the progress of the video game in accordance with the one of the scenario data, character data, map data and item data corresponding to a desired created-object which corresponds to the desired created-object icon wherein the central processor receives the selection of the desired created-object icon in response to the player moving the player character to overlap with the desired created-object icon on the display screen.

2. The video game processing apparatus according to claim 1, wherein the graphic drawn by the player is displayed on the display screen in a drawing screen separate from a game screen in which the video game progresses.

3. The video game processing apparatus according to claim 2, wherein the drawing screen is divided into a plurality of regions and the graphic recognizer recognizes a size of the graphic based upon positions and a number of the plurality of regions to which the graphic belongs.

4. The video game processing apparatus according to claim 1, wherein the graphic is drawn in a color selected from a plurality of pieces of color data, and the graphic recognizer recognizes the color of the graphic.

5. The video game processing apparatus according to claim 1, wherein the graphic recognizer recognizes a shape of the graphic based upon at least one of shapes, positions, sizes and angles of at least one of straight lines and curved lines constituting the graphic.

6. The video game processing apparatus according to claim 1, wherein
when the selector selects the at least one selected created-object, an icon image having the created-object information corresponding to each of the at least one selected created-object is displayed based upon the created-object graphic data corresponding to each of the at least one selected created-object.

7. The video game processing apparatus according to claim 6, wherein the created-object data table includes model created-object graphic data serving as model input data of an abstract graphic to be drawn by the player with a graphics processor to create the created-object icons.

8. The video game apparatus according to claim 7, wherein a plurality of pieces of the created-object information relating to the scenario data, the character data, the map data and the item data are provided in association with different respective ones of the created-objects, and it is determined which of the scenario data, the character data, the map data and the item data is selected based upon a difference between the graphic and the model created-object graphic data.

9. The video game processing apparatus according to claim 7, wherein the selector selects, from the created-object graphic data stored in the created-object data table, at least one piece of the created-object graphic data that is most similar to at least a shape of the graphic recognized by the graphic recognizer, and displays the at least one displayed created-object icon corresponding to the at least one piece of the created-object graphic data on a matching result display screen.

10. The video game processing apparatus according to claim 9, wherein the selector selects, from the created-object graphic data stored in the created-object data table, pieces of the created-object graphic data that are similar to at least the shape of the graphic recognized by the graphic recognizer, and displays a plurality of displayed created-object icons corresponding to the pieces of the created-object graphic data on the matching result display screen.

11. The video game processing apparatus according to claim 10, wherein, when the plurality of displayed created-object icons are displayed on the matching result display screen, the desired created-object icon is selectable from the plurality of displayed created-object icons.

12. The video game processing apparatus according to claim 9, further comprising:
a matching result confirmer that allows a player to confirm whether a matching result of the at least one displayed created-object icon displayed on the matching result display screen is intended, and when the matching result confirmer confirms that the matching result is intended, a determination process of the matching result is performed by a matching result determiner.

13. The video game processing apparatus according to claim 7, further comprising:
a graphic recognition error notifier that, when there is no created-object graphic data similar to the graphic recognized by the graphic recognizer, notifies the player that no corresponding created-object graphic data exists.

14. The video game processing apparatus according to claim 13, wherein an error display made by the graphic recognition error notifier includes a display that allows the player to select whether to one of input the graphic again and cancel graphic input processing.

15. The video game processing apparatus according to claim 1, wherein the created-object data table includes created-object graphic data acquisition condition information for determining whether it is possible to display the created-object icon on the display screen with the graphics processor based upon one of a level of the player character and the progress of the game.

16. A video game processing method for controlling a progress of a video game by displaying a player character on a display screen of an image display apparatus and controlling an action of the player character displayed on the display screen in accordance with an operation by a player, the video game processing method comprising:
storing, in a memory, a created-object data table that includes created-object icons to be displayed on the display screen and created-object information relating to one of scenario data, character data, map data and item data corresponding to created-objects, the created-object icons corresponding to the created-objects and stored in association with created-object graphic data;
recognizing a graphic drawn by the player;
selecting, from the created-object graphic data stored in the created-object data table, at least one selected created-object of the created-objects similar to the graphic drawn by the player;
displaying at least one displayed created-object icon of the created-object icons corresponding to the at least one selected created-object on the display screen;
receiving a selection of a desired created-object icon of the at least one displayed created-object icons from the player in accordance with the operation by the player; and
controlling the progress of the video game in accordance with the one of the scenario data, character data, map data and item data corresponding to a desired created-object which corresponds to the desired created-object icon wherein the selection of the desired created-object icon is received in response to the player moving the player character to overlap with the desired created-object icon on the display screen.

17. A non-transitory computer-readable medium including a video game processing program for causing a computer to control a progress of a video game by displaying a player character on a display screen of an image display apparatus and controlling an action of the player character displayed on the display screen in accordance with an operation by a player, the video game processing program causing the computer to execute:
managing a created-object data table that includes created-object icons to be displayed on the display screen and created-object information relating to one of scenario data, character data, map data and item data corresponding to created-objects, the created-object icons corresponding to the created-objects and managed in association with created-object graphic data;
recognizing a graphic drawn by the player;
selecting, from the created-object graphic data stored in the created-object data table, at least one selected created-object of the created-objects similar to the graphic drawn by the player;
displaying at least one displayed created-object icon of the created-object icons corresponding to the at least one selected created-object on the display screen;
receiving a selection of a desired created-object icon of the at least one displayed created-object icons from the player in accordance with the operation by the player; and
controlling the progress of the video game in accordance with the one of the scenario data, character data, map data and item data corresponding to a desired created-object which corresponds to the desired created-object icon wherein the selection of the desired created-object icon is received in response to the player moving the player character to overlap with the desired created-object icon on the display screen.

* * * * *